United States Patent [19]

Mason et al.

[11] 3,731,866

[45] May 8, 1973

[54] APPARATUS FOR REMOVING AND REPLACING MULTI-PINNED COMPONENTS MOUNTED ON CIRCUIT BOARDS

[75] Inventors: Roger S. Mason, Poughkeepsie; George R. Pullis, Fishkill, both of N.Y.

[73] Assignee: Cogar Corporation, Wappingers Falls, N.Y.

[22] Filed: Jan. 4, 1971

[21] Appl. No.: 103,645

[52] U.S. Cl. ........................228/6, 29/203 B, 228/19, 228/33

[51] Int. Cl. ..............................................B23k 1/00

[58] Field of Search..........................228/4, 19, 6, 20, 228/21, 33; 219/85; 118/50, 400; 29/487, 203 B, 426

[56] References Cited

UNITED STATES PATENTS

| | | | |
|---|---|---|---|
| 3,230,338 | 1/1966 | Kawicki | 219/85 |
| 3,382,564 | 5/1968 | Gallentine | 228/20 X |
| 3,522,407 | 8/1970 | Costello | 219/85 |
| 3,576,969 | 5/1971 | Swey et al. | 219/85 |

OTHER PUBLICATIONS

Rose, E. N., Removal of Soldered Components, IBM Technical Disclosure Bulletin, Vol. 6, No. 12, May 1964.

*Primary Examiner*—J. Spencer Overholser
*Assistant Examiner*—Robert J. Craig
*Attorney*—Gottlieb, Rackman & Reisman and Harry M. Weiss

[57] ABSTRACT

An apparatus for removing a selected electrical component soldered into a circuit board and replacing such component with another component is provided and includes a frame plate on which the circuit board is mounted. A head assembly is positionable over the component to be removed and replaced, and this assembly carries a pair of heads, namely a component pickup head and a component insertion head. A soldering unit is positioned below the circuit board and shifts with the head assembly. The soldering unit liquifies the solder holding the selected component in place, the pickup head removes the component from the board, the insertion head puts a new component in its place, and the soldering unit solders it into the circuit board.

11 Claims, 10 Drawing Figures

INVENTORS
ROGER S. MASON
GEORGE R. PULLIS
BY Gottlieb, Rackman & Reisman
Harry M. Weiss
ATTORNEYS

APPARATUS FOR REMOVING AND REPLACING MULTI-PINNED COMPONENTS MOUNTED ON CIRCUIT BOARDS

This invention relates to an apparatus for removing selected electrical components which are mounted by soldering on printed circuit boards and replacing such components with other components.

Printed circuit boards are well-known in the art and are understood to comprise a non-conductive stiff card with printed circuitry thereon. The card is adapted to receive a quantity of multi-pinned electrical components. To this end, the card has formed therein a number of via holes, that is, holes of a small bore with a conductive lining. A number of such via holes in a board comprise a set which is intended to receive a mating set of pins of an electrical component. The printed circuit carried by the card interconnects with the via holes and thus with the pins of the electrical components. After such a circuit card has had all of its electrical components soldered in place, upon occasion it becomes desirable to remove one or a few selected components and replace them with other components. This may be required when the component to be replaced is defective, and the replacing component is of the same type, but up to standard.

Heretofore, the operation of removing one component and replacing it with another has been essentially manual in nature, and thus has been quite time-consuming, laborious, and has made exacting demands upon a worker. The manual process was also subject to numerous "trial" runs before being properly completed. In this usual manual method, heretofore in heretofore the printed circuit board was mounted on a frame, and heat was applied to the pins of a component to be replaced, the component at this time being mounted on the board. This was done in order to bring the solder holding the pins of the component to a molten state. When this point was reached, a tool was used by the worker to pull the component away from the board. Then, the new component was manually placed by the worker so that its pins were inserted into the now empty via holes, and again these holes were heated and solder was flowed into them to make a permanent connection.

Not only was the foregoing process slow, but care had to be exercised by the worker to ensure that the pins of the replacing component were not bent. Moreover, on numerous occasions, bits of solder remained in one or more of the via holes which blocked the implacement of the new component. If such blockage did take place, the via holes had to be reheated and cleared of the excess solder. This was typically done by the application of air under pressure, and then again the new components put into place. Since the smallest bit of solder in any one of the via holes would prevent the insertion of the new component, often several trial runs had to be made before a new component could be properly inserted into the board and soldered into place.

Since the production of printed circuit cards with components mounted thereon has now in itself become automated by various industrial concerns, the need for an apparatus for removing and replacing such components quickly and efficiently, without manual intervention, has become quite pronounced. Specifically, producers of printed circuitry have for some time required an apparatus which will act upon a printed circuit card with components mounted thereon, and which will quickly and efficiently liquify the solder holding a defective component in place, and in turn pull this defective component from the circuit board, insert another component in the same location in the printed circuit board, and apply solder to the pins thereof. The foregoing must be carried out while eliminating any possibility of small bits of solder blocking the via holes prior to insertion, which would have the effect of preventing the continuous operation of the desired apparatus. Moreover, it has been found that with the automation of the foregoing steps, the quality of soldering increases and is uniform, as opposed to manual soldering.

It is thus primary object of the present invention to provide an apparatus for removing and replacing components soldered into printed circuit boards which does so in an automated, speedy and continuous manner, and which results in a soldered connection between a component and the circuit board which is of high and uniform quality.

It is a further object of the present invention to provide an apparatus for removing and replacing components soldered into printed circuit boards, wherein the apparatus operator need only place the shiftable head assembly of the apparatus over the defective component, and upon subsequent operation of the apparatus, the apparatus will heat and melt the solder holding the defective component in place, remove the component from the board, place another component into the area on the board left empty, and resolder this latter component into place, all of these steps being carried out without further manipulation by the apparatus operator.

In general, and in accordance with the teaching of the present invention, there is provided an apparatus which includes a frame plate on which a circuit board having components soldered therein, is mounted. The apparatus further includes a head assembly and a soldering unit which are linked for common movement about perpendicular axes with respect to the board. The head assembly shifts above the board while the soldering unit shifts below the board. The head assembly includes a component pickup head and a component insertion head. Each of these heads is movable toward and away from the board and each includes a vacuum cylinder. The assembly is positioned so that the pickup head is directly over the component to be replaced and the soldering unit is directly below it. The soldering unit liquifies the solder holding the component to be replaced in place, and the pickup head lifts it from the board, utilizing its vacuum to grip it. The insertion head, holding a new component by its vacuum, is stepped into place over the now-empty spot on the board, and lowers its component so that its pins slip into the empty via holes in the board. The soldering unit then flows solder against the underside of the board at this location to fix the new component into its desired position.

Other objects, features and embodiments of the invention are contemplated and will be apparent from the following more detailed description with reference to the accompanying drawings, wherein.

Figure 1:
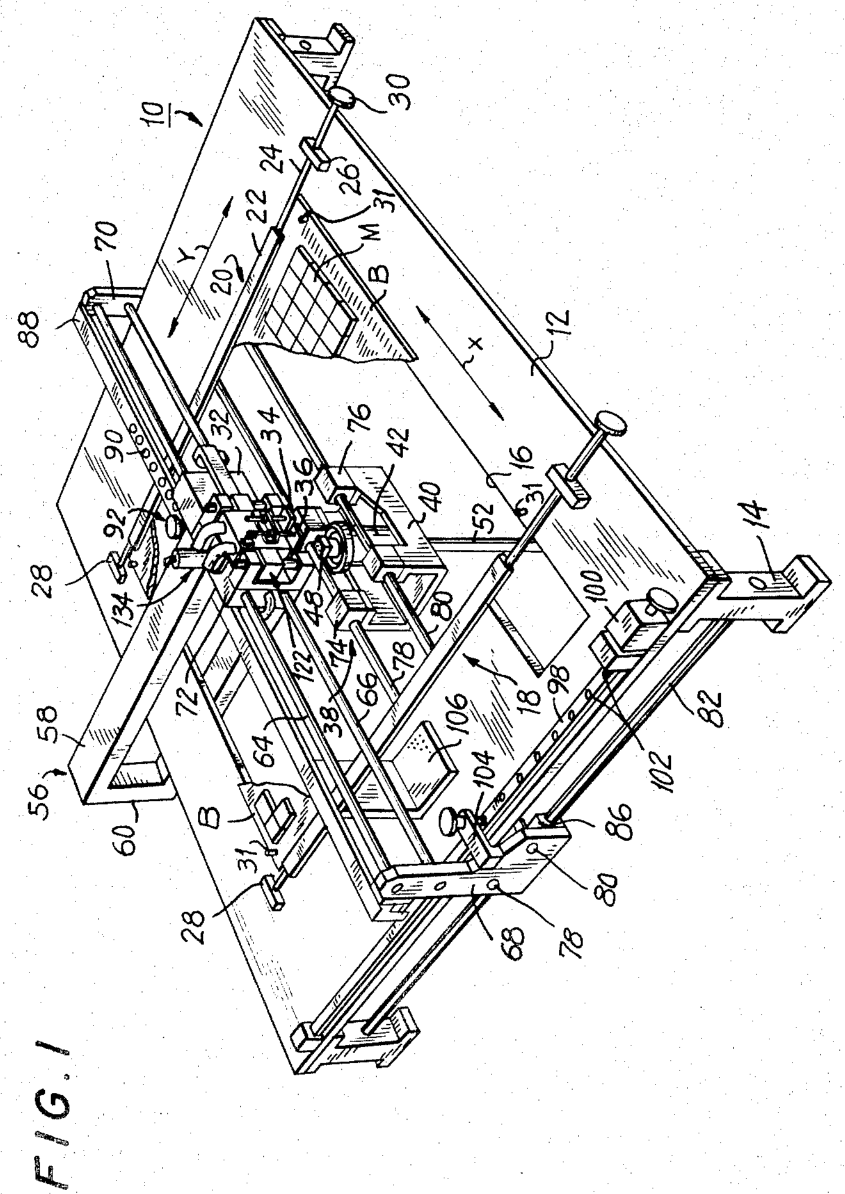
FIG. 1 is a perspective view of the apparatus with a printed circuit board in place on the apparatus, the circuit board being partially broken away to reveal other components of the apparatus.
Figure 2:
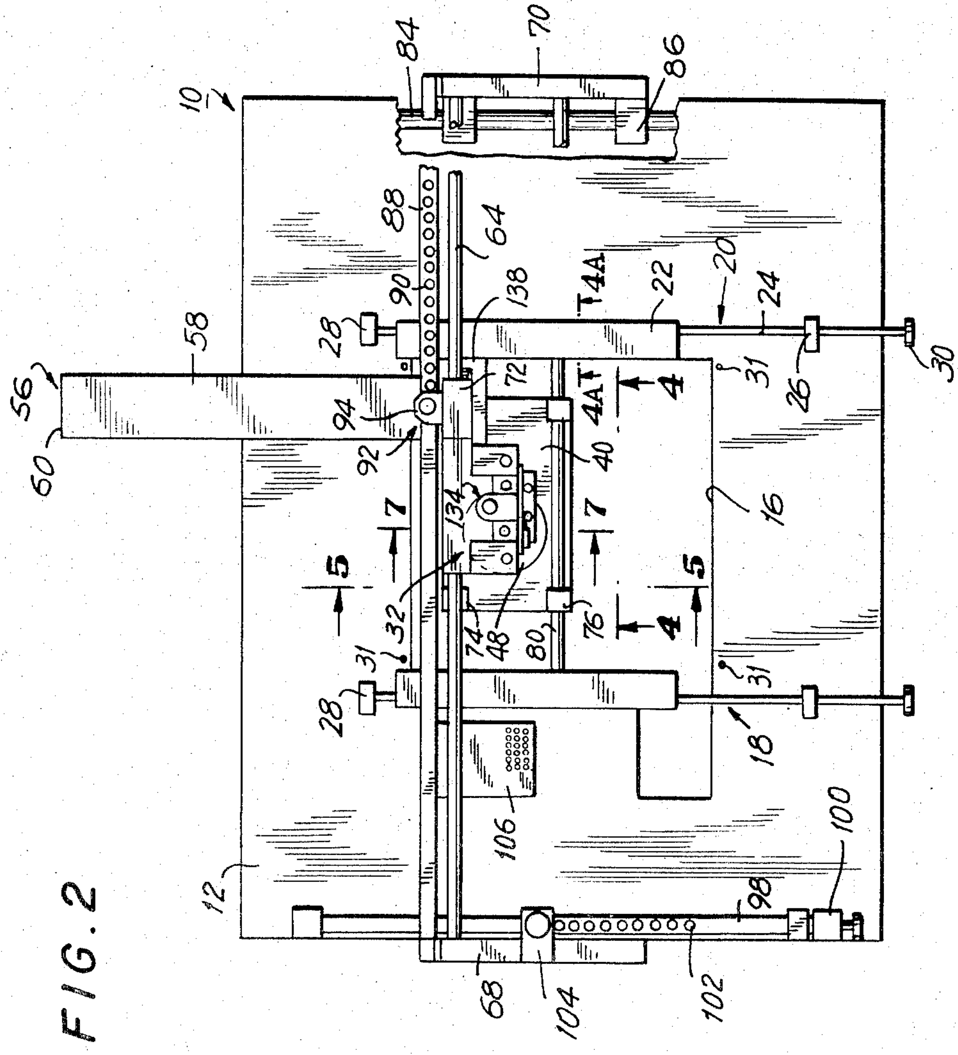
FIG. 2 is a top plan view of the apparatus.
Figure 3:
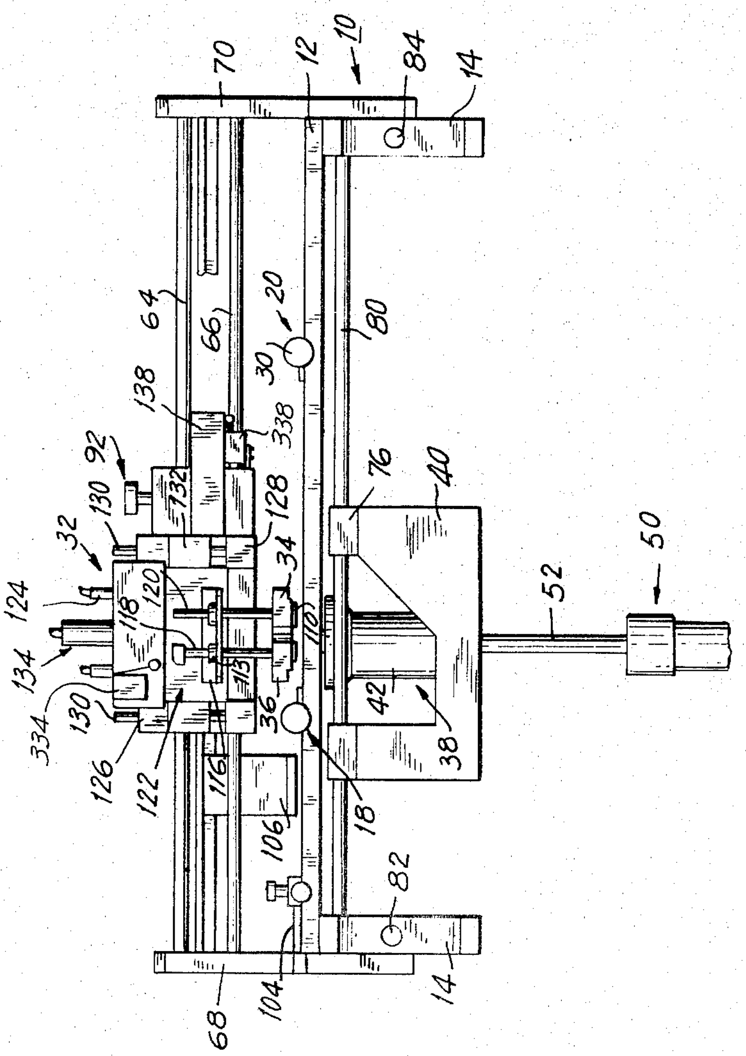
FIG. 3 is a front elevational view of the apparatus.

Referring now in detail to the drawings, and especially to FIGS. 1, 2 and 3 thereof, the apparatus for removing and replacing electrical components includes a frame 10 including a generally flat horizontally-oriented frame plate 12 supported by a number of legs 14. The plate 12 has a large central opening 16 having exterior dimensions similar to those of a printed circuit board B on which the apparatus is intended to operate.

Figure 4A:
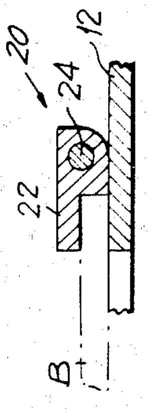
FIG. 4A is a fragmentary cross sectional view of the circuit board clamps taken substantially along the line 4A—4A of FIG. 2.

Means removably retains the printed circuit board B accurately in position with respect to the opening 16 in the frame 10 and in a horizontal plane. Said means may comprise clamps conventional in the art for this purpose. In the embodiment shown, the retaining means comprises a pair of such clamps 18, 20, each of which is situated on a different side of the opening 16. Each clamp includes a flap 22 of L-shaped configuration fixed to an elongated rod 24 which is journaled in a pair of bearings 26, 28 mounted on the frame plate. The forward end of each rod 24 terminates in a knob 30 whereby the rod 24 and the flap 22 attached to it, may be rotated between an open position and a closed position. As best seen in FIG. 4A, the flap 22 when rotated in a direction toward the opening 16 overlaps the printed circuit board B and retains it in place. To remove the board, the knobs 30 are rotated in opposite directions thereby lifting the flap 22 so that the printed circuit board B may be removed.

The card B may have a pair of spaced holes therein, which fit over upstanding prongs 31 on the frame plate 12, thereby to position the card accurately with respect to the opening 16 and the remainder of the apparatus.

The apparatus further includes a shiftable head assembly 32 which includes a component insertion head 34 and a component pickup head 36. The structural details of the foregoing head assembly will be described in detail subsequently; it need only be mentioned at this point that the head assembly 32 carries both the insertion head 34 and the pickup head 36, the latter being utilized to remove a component from the printed circuit board, while the former inserts a component into such board subsequent to the aforesaid removal and at the same spot. The head assembly 32 with is insertion head 34 and pickup head 36 are positioned immediately above the frame plate 12 and thus above the printed circuit board B which is held on the frame plate.

Figure 5:
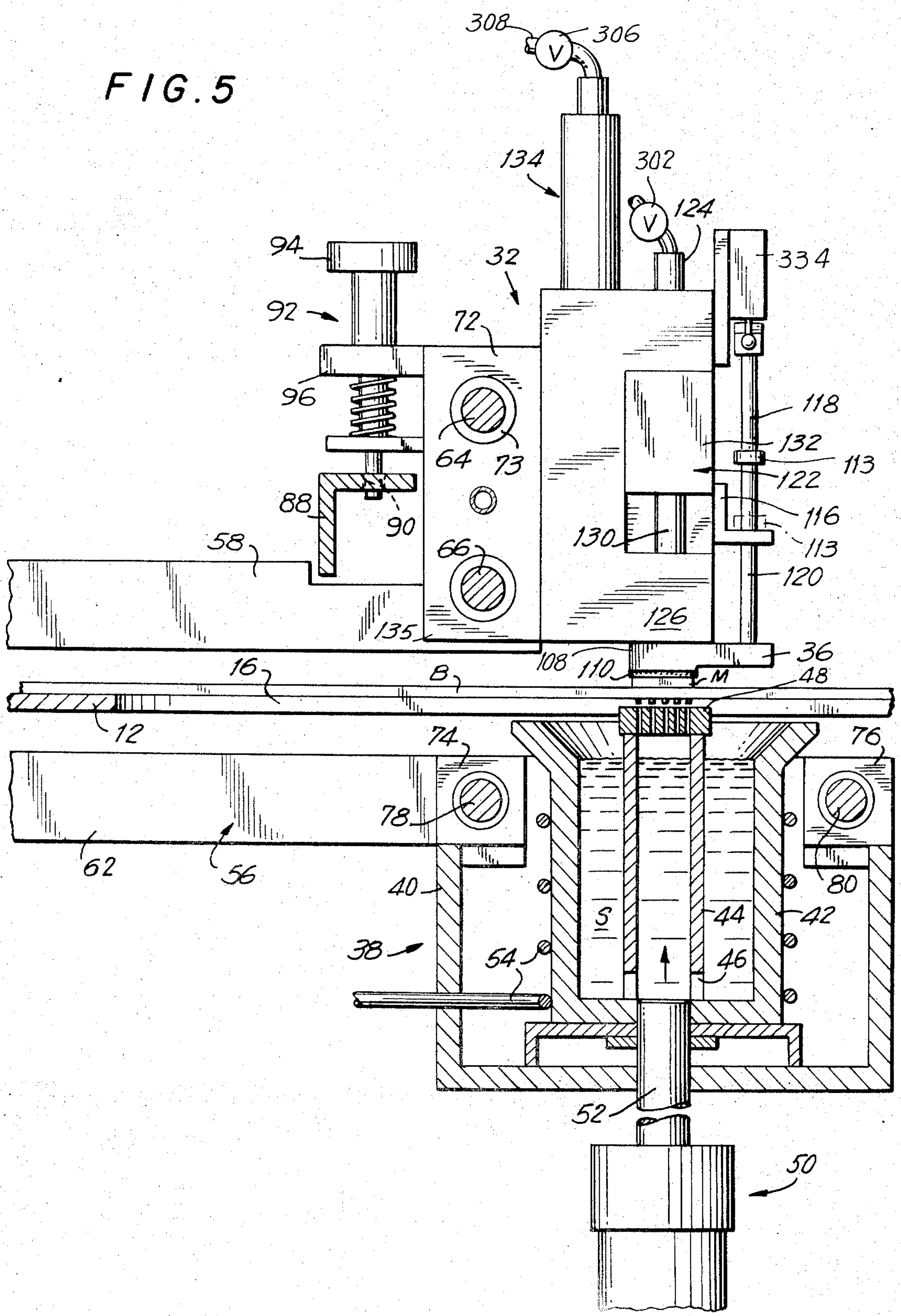
FIG. 5 is an enlarged cross-sectional view of the head assembly and soldering unit of the apparatus taken substantially along the line 5—5 of FIG. 2.

Linked to the head assembly 32 is a soldering unit 38 adapted to de-solder multi-pinned components from printed circuit boards and to solder replacement components back into place. Such units are well-known in the art and typical of these is Model No. DSM-2A, sold by Air-Vac Engineering Company of Milford, Connecticut. The operative portion of such a soldering unit 38 is shown in the drawings and especially in FIGS. 1 and 5, for purposes of completeness of this specification. The soldering unit 38 includes a carriage 40 within which is mounted a solder reservoir 42. A solder well 44 is concentrically situated within the reservoir 42 and the interior of the well is in communication with the interior of the reservoir 42 by ports 46. The top of the well 44 is covered by an apertured cap 48. A piston assembly 50 is located immediately below the carriage 40 and includes a piston 52 which extends into the well 44 for the purpose of pumping solder. A heater 54 encircling the reservoir keeps the solder S therein in a molten state. In operation, both the reservoir 42 and the well 44 are filled with molten solder S to a level slightly below the top of the reservoir. When it is desired to apply a wave of hot solder to the pins of an electrical component, the piston assembly 50 is actuated, causing the piston 52 to move upwardly into the well 44, first closing the ports 46 and then pumping the solder within the well 44 upwardly through the apertures in the cap 48 to overflow the cap and to come into contact with and liquify the solder surrounding the pins of an electrical component mounted on the board B. Any excess solder runs back into the reservoir 42. The soldering unit 38 is situated below the frame plate 12, with the cap 48 of the well 44 extending to a limited degree upwardly into the opening 16 in the frame plate 12, so that said cap 48 can be located relatively close to the underside of a printed circuit board B.

The head assembly 32 and the soldering unit 38 are linked for mutual co-extensive movement by an arm 56. The arm is of C-shaped configuration (see FIG. 1) and has a horizontally extending upper reach 58 which is fixed to a rear portion of the head assembly 32 and which extends rearwardly with respect to the frame 10, a vertically extending cross-bar 60 which runs from the upper reach 58 above the plate 12 to below it, and a horizontally extending lower reach 62 which runs from the lower end of the cross bar 60 to a rear portion of the soldering unit carriage 40.

Means mounts the head assembly 32 and the soldering unit 38 from movement about perpendicular axes with respect to the frame plate 12. These axes will arbitrarily be designated the X axis and the Y axis in FIG. 1. The head assembly 32 is mounted for movement along the X axis by a pair of parallel guide rods, including an upper guide rod 64 and a lower guide rod 66, which are both elongated and parallel to said X axis. The guide rods 64, 66 are retained in parallel spaced relationship by a pair end brackets 68, 70, each bracket being located at a different side of the frame plate 12.

A guide block 72 joined to the rear of the head assembly 32 and has a pair of horizontal bearings 73 through which the guide rods 64, 66 pass to thereby enable the block 72 to slide thereon and to carry the head assembly 32 with it. This sliding of the head assembly 32 along the rods 64, 66 enables movement of the head assembly 32 along the X axis. For an analogous purpose, two pairs of guide blocks 74, 76 are fixed to the carriage 40 of the soldering unit 38 and another pair of guide rods, a rear guide rod 78 and a forward guide rod 80 pass through the blocks 74, 76 respectively. The guide bars 78, 80 are held in parallel relation to one another and to the X axis by lower portions of the end brackets 68, 70. Thus, the guide blocks 74, 76 and thus the carriage 40 of the soldering unit 38 may slide along the X axis and do so to the same degree and extent as the head assembly 32.

As mentioned previously, both the head assembly 32 and the soldering unit 38 are mounted for simultaneous movement along the Y axis. For this purpose, a pair of guide rods 82, 84 is mounted between pairs of the apparatus legs 14, and are held thereby parallel to one another and parallel to the Y axis. Each of the end brackets 68, 70 carries a pair of guide blocks 86 through which these rods pass so that the end brackets 68, 70 are mounted for sliding movement along the guide rods 82, 84 respectively. The head assembly 32 and the soldering unit 38, being mounted for simultaneous movement along the X and Y axes, can be positioned at any location over and below the printed circuit board B, respectively.

In a preferred embodiment of the present invention, the apparatus is used with printed circuit boards having a number of substantially identical integrated circuit modules M soldered thereon. These modules are arranged in ranks and files, and are uniformly spaced with respect to one another. In order to enable the head assembly 32 to be accurately positioned with respect to any designated defective module, indexing means are provided for the head assembly along both the X and Y axes. The indexing means along the X axis comprises an elongated indexing bar 88 which runs between the end brackets 68, 70. The indexing bar has a number of apertures 90 therein spaced uniformly and spaced apart a distance the same as the distance between centers along the X-axis of modules M on the board B. A detent 92 which comprises a headed shaft 94 spring mounted by a bracket 96 on the rear of the guide block 72, fits into any desired one of these apertures 90, and thereby positions the head assembly and the soldering unit 38 along the X-axis. In a similar manner, indexing means are provided to properly position the head assembly 32 and the soldering unit 38 with respect to the Y axis. To this end, an elongated bar 98 is positioned by a bracket 100 on the frame plate 12 and is parallel to said Y axis. Said bar 98 has a series of apertures 102 which are equally spaced and which are spaced apart a distance the same as the distance between centers along the Y axis of the modules M. Another detent 104 is carried by the end bracket 68 and is similar in construction to the detent 92. The detent 104 fits into any one of the apertures 102 and thereby properly positions the head assembly 32 and the soldering unit 38 in any desired spot over and below a module M, respectively on a printed circuit board B along the Y-axis thereof.

A loading pad 106 depends from the bar 88 and is intended to hold a component which is to replace the defective component in the printed circuit board. The pad 106 is an L-shaped member which has a vertical arm fixed to an end portion of the bar 88, relatively close to the end bracket 68. The horizontal arm of the pad 106 rides slightly above the frame plate 12, and has a number of apertures therein which are configured to receive the pins of a component to be implanted into the board B. As will be seen, the head assembly 32 is brought over the pad 106 to pick up a component carried by the pad, during the removal and replacement process.

The head assembly 32 carries, as has been mentioned, a component pickup head 34 and a component insertion head 36. The heads are generally similar in structure and each includes a head block 108 to the underside of which is attached a pliable and desirably rubber sealing washer 110. The configuration of the washer mates with the configuration of the top surface of the components on the board B and in the embodiment shown is square. Each head 34, 36 is similarly mounted for substantially vertical movement with respect to the head assembly toward and away from the board B. To this end, each head is fixed to the lower end of a cylinder 112 slidably mounted for vertical movement in a bore 114 in the assembly. A light tension spring 115 in each bore urges its associated cylinder downwardly. A shelf 116 fixed to the exterior of the assembly guides the movement of a pair of rods 118, 120 which are fixed at their lower ends to the head blocks 108. These rods prevent rotation of the cylinders 112. The rods each carry a stop 113 to limit their movement with respect to the shelf 116 and thus to limit the movement of the heads 34, 36 with respect to the head assembly. The aforesaid bores 114 are formed in a slide 122 which is shiftable on the assembly, and thus the heads 34, 36 are shiftable with respect to the slide 122. A duct 124 at the top of each bore 114 leads to a separate vacuum source.

The slide 122 is itself mounted for substantially vertical sliding movement toward and away from the board B within the assembly 32. For this purpose, the assembly includes a pair of vertically-elongated rails 126, 128 situated on different sides of the slide 122 and fixed to the guide block 72. (See FIG. 8) Each rail is of C-shaped configuration and includes a rod 130 which runs between the arms thereof. A pair of guide blocks 132, one fixed to each side of the slide 122, shift upwardly and downwardly along the rods 130 to enable the slide 122 to shift on the assembly toward and away from the circuit board B and frame plate 12 to a limited degree. The slide 122 is driven in this movement by a hydraulically operated piston and cylinder assembly 134, the piston 139 of which protrudes (see FIG. 7) from an arm 138 fixed to the top of the slide 122 downwardly against the top of the guide block 72. An extension of the piston 139 causes upward movement of the slide 122 while, conversely, retraction of the piston causes downward movement of the slide 122 under the influence of gravity.

The apparatus further includes a stepping mechanism which, upon appropriate signal, shifts both the insertion head 34 and the extraction head 36, so that after the extraction head 36 has removed a component from the board, the insertion head 34 is shifted laterally over the same location, preparatory to the insertion of a component into the circuit board. For this purpose, the guide block 72 includes two adjacent sections, a step section 135 and a guide section 136. The guide rods 64, 66 pass through both of these sections 135, 136 to hold them in alignment and to enable one to slide with respect to the other and as a unit on the rods. The step section 135 is fixed to the guide rails 126, 128 and accordingly the slide 122 and the heads 34, 36 are carried by this section. Fixed to the guide rail 128 is a horizontally extending stop arm 138 which reaches to a point beyond the guide section 136 and which carries a bolt threaded into a rearwardly-protruding end stop 140 of the stop arm 138. The position of this stop 140 limits movement of the guide section 136 relatively away from the step section 135. A spring 142 carried between the stop 140 and a stud 144 protruding from the adjacent end of the guide section 136, urges the guide section 136 away from the stop 140 and towards the step section 135 so that the sections 135, 136 are normally adjacent. The step section 135 and the guide section 136 are driven apart along the guide rods 64, 66 by a piston and cylinder assembly. For this purpose, an elongated piston rod 146 has its end threaded into the guide section 136 and extends through a bore internally into the step section 135. A cylinder 148 is carried by the step section 135 and the piston head 150 of the piston reciprocates in it. Accordingly, when air under pressure is admitted through valve 152, the head 150 is relatively driven in a direction of out of the cylinder 148 and the step section 135 is moved away from the guide section 136 until a point at which the stop 140 contacts the stud 144. In a preferred embodiment of the present invention wherein integrated circuit modules are carried by the circuit board, the distance between stud 144 and the end of the stop 140 is the same as the distance between centers of such modules along the X-axis.

Turning now to the sequence of operation of the apparatus, first the circuit board B is mounted on the frame plate 12 between the clamps 18, 20 and is properly aligned by the prongs 31 on the plate 12 passing through apertures on the edges of the circuit board. A component which is to be placed into the circuit board (the "new component") is placed with its pins in the via holes in the pad 106. At the start of the sequence, the air pressure valve to the piston and cylinder assembly 134 is open, thereby extending the piston 139 so that the slide 122 is raised on the rails 126, 128. At the same time, the heads 34, 36 hang at their lowermost positions on the slide 122, being limited in their downward movement by the stops 113 on the rods 118, 120 hitting the shelf 116. In these positions, the heads 34, 36 are located slightly higher than the level of the top surfaces of the components mounted on the circuit board. Further, the valves for the vacuum sources which lead into the cylinders 112 for both heads 34, 36 are open.

Next, head assembly 32 is slid to the left in FIG. 1 on the guide rods 64, 66 so that the insertion head 34 is directly over the new component on the loading pad 106. The detent 92 fits into an appropriate aperture 90 on the bar 88 to align the insertion head 34 over the new component on the loading pad 106.

Next, the valve controlling the air pressure to the assembly 134 is momentarily closed, enabling the piston 139 to retract, whereupon the slide 122 lowers on the guide rails 126, 128 toward the circuit board. As this shifting movement takes place, the washer 110 carried by the insertion head 34 mates with the top surface of the component. This mating action seals the bottom of the insertion head 34 so that the vacuum source which leads into the cylinder 112 causes an immediate drop of pressure therein. This pressure drop causes the cylinder 112 and its head block 108 (still carrying the new component) to shift upwardly in the slide 122. This movement continues until this head block 108 contacts the undersurface of the slide 122, this position being shown in dot-and-dash lines in FIG. 4. The valve supplying air to the assembly is again opened, raising the slide.

The head assembly 32 is now manually shifted along the X axis and the Y axis so that the extraction head 36 of the assembly is positioned immediately above the component to be replaced (the "old" component). The adjustment along the X axis is accomplished by lifting the detent 92 and sliding the head assembly 32 in either direction along the guide rods 64, 66 until a desired position along the X axis is reached, and then permitting the detent 92 to spring into one of the apertures 90. Positioning along the Y axis is achieved by sliding the head assembly 32 so that the end brackets 68, 70 slide along the guide rods 82, 84, until the detent 104 is inserted into a desired aperture 102 in the bar 98. Since the components are usually arranged in ranks and files, the positioning of the aforesaid detents in their respective selected apertures properly positions the head assembly 32 and specifically the extraction head 36 over a selected component. The shifting of the head assembly 32 has similarly shifted the soldering unit 38, so that the cap 48 of this unit is directly below the selected component.

Figure 6:
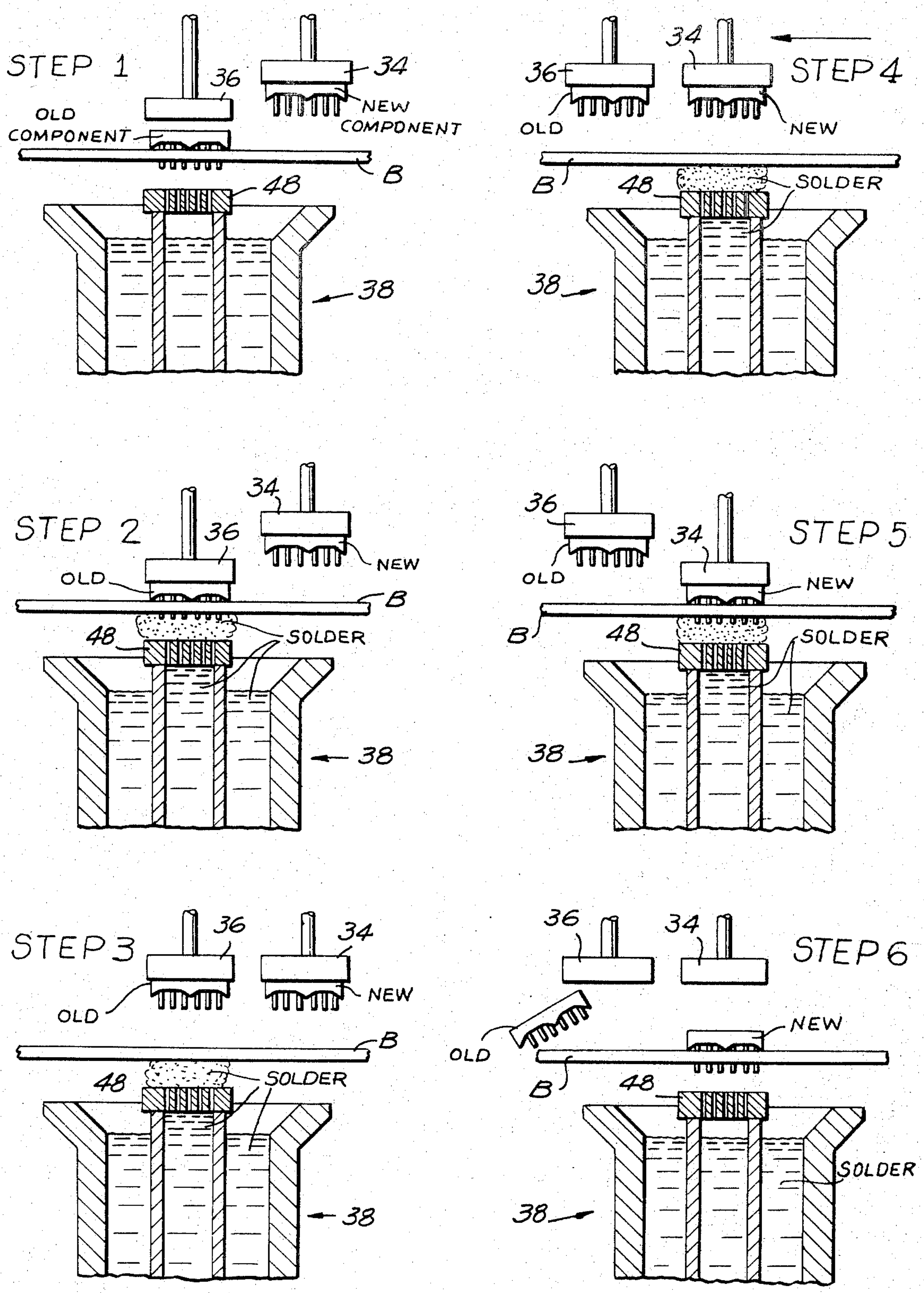
FIG. 6 shows the various steps, numbered 1 through 6, in the removal and replacement of components from a circuit board.

Continuing with the sequence of operation, the valve controlling the supply of air pressure to the assembly 134 is again closed, permitting the piston 139 to retract so that the slide 122 shifts downwardly on the guide rails 126, 128. As the slide moves downwardly, the washer 110 of the extract head 36 mates with the old component. At this point in the sequence of operation, the assembly is at Step 1 shown in FIG. 6, wherein the heads 34, 36 are shown symbolically. This mating action closes the cylinder and the vacuum urges the head 36 upwardly into the slide 122 until the head block 108 of the extract head 36 contacts the undersurface of the slide 122, reaching the position shown in dot-and-dash lines in FIG. 4.

The soldering unit 38 was brought into operation as the slide 122 was descending by the piston 52 of the piston assembly 50 being driven upwardly into the well 44, forcing solder therein to pass through the cap 48 and to form a wave crest above the cap. Since the cap is close to the underside of the board B, the wave crest flows against the pins of the old component and against the related via holes. The head from the solder liquifies the solder holding the pins of the old component, whereupon the extract head 36 can pull the old component from the board. These steps are shown in Step 2 and Step 3 in FIG. 6, Step 2 showing the initial engagement of the extract head 36 with the old component and the solder wave crest being applied to the underside thereof and Step 3 showing the extract head 36 having pulled the old component from the board. The wave crest is still maintained against the underside of the board by the pumping action of the piston 52, to keep any solder in the via holes just emptied in a molten state. As the extract head 36 moves upwardly, its guide rod 118 is also raised, and the top end of said guide rod hits the contact of a microswitch (see FIG. 4) to initiate the next step.

The old component now having been removed from the circuit board, the stepping mechanism shifts the head 34, 36 so that the insertion head 34, still carrying the new component, is shifted laterally over the spot at which the extraction head 36 was just located. For this purpose, the abutment of the upper end of the guide rod 118 and the microswitch contact causes the valve 152 to open to permit air under pressure to enter the cylinder 148 within the step section 135 of guide block 72. This causes the step section 135 to shift away from the guide section 136, overcoming the force of the spring 142 until the stop 140 contacts the stud 144. The shifting movement of the step section 135 carries with it the slide 122, and thus both of the heads 34, 36. The lateral shifting movement as described shifts the assembly 32 to an extent such that the insertion head 34 (carrying the new component) is shifted along the X axis to a point at which the extraction head 36 previously was. The positions of the heads 34, 36, immediately after this lateral shift, is shown in Step 4 of FIG. 6.

Figure 7:
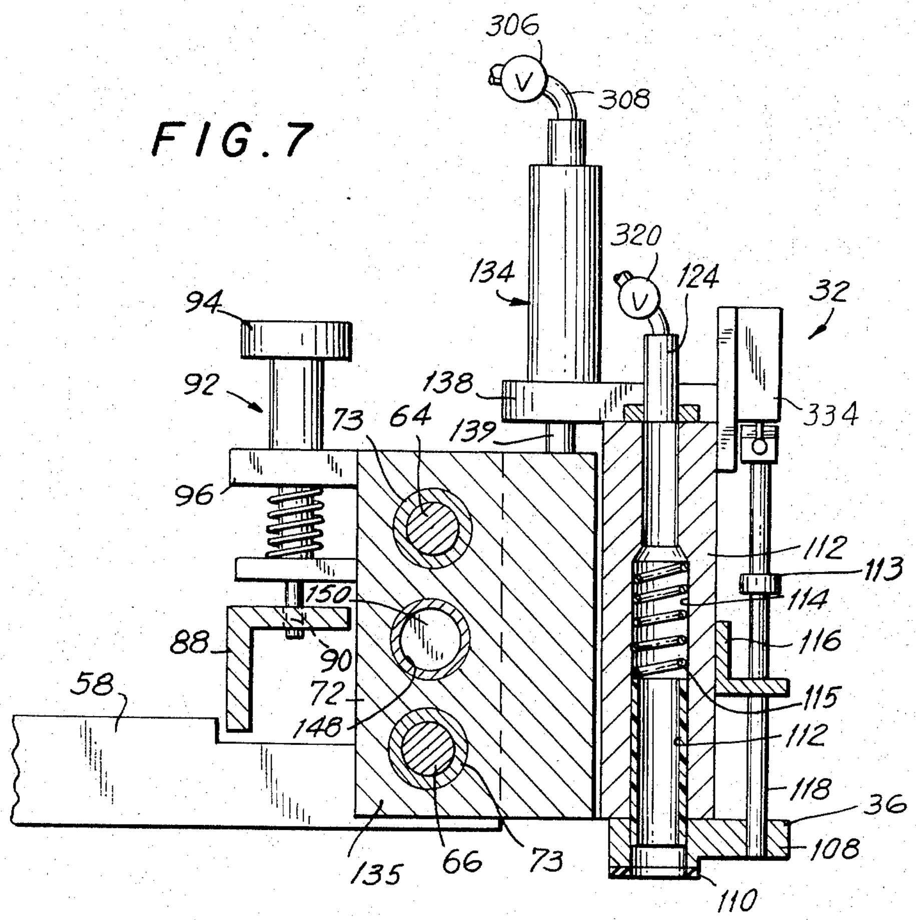
FIG. 7 is an enlarged cross sectional view of the head assembly, showing the structure of the component pick-up head, taken substantially along the line 7—7 of FIG. 2.
Figure 8:
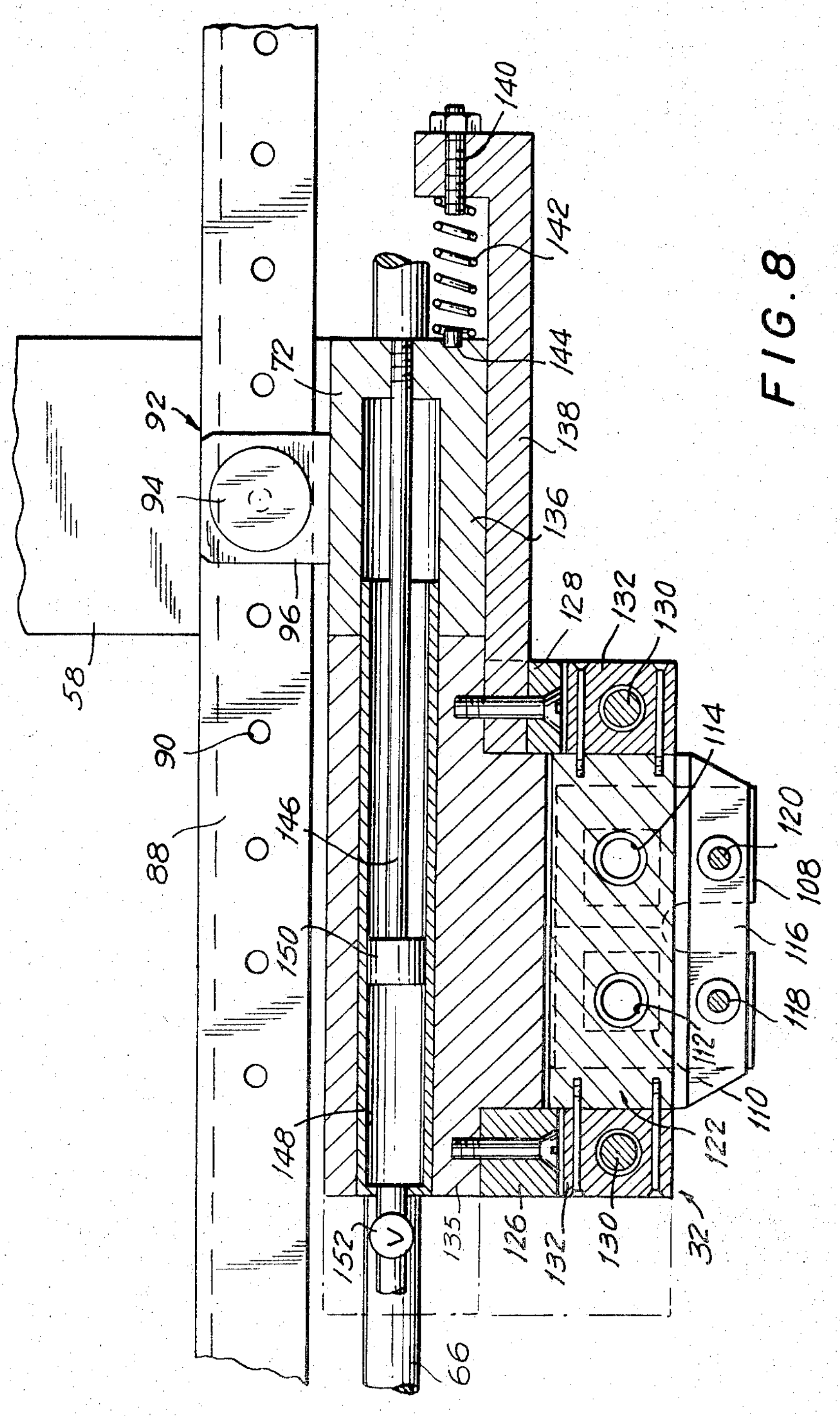
FIG. 8 is an enlarged horizontally-taken cross sectional view of the head assembly taken substantially along the line 8—8 of FIG. 4.

Next, the valve controlling the supply of vacuum to the cylinder 112 of the insertion head 34 is closed, permitting the head to drop downwardly with respect to the slide 122 under the force of gravity and under the urging of the spring 155 (see FIG. 7). The force of this spring ensures that the head 34 will drive the new component downwardly, rather than permitting the component merely to fall under its own weight downwardly and away from said head. The downward movement of the insertion head moves the new component toward the circuit board B, so that the pins thereof are inserted into the empty via holes. This step is shown in Step 5 of FIG. 6, with the solder wave crest still being maintained to cause the solder already in the via holes to remain in a molten state and to flow fresh solder into the via holes to solder the new module pins into their desired location. Since the valve connecting the vaccum source to the insertion head 34 has been shut, the grip between this head and the new component is broken.

Next, the valve controlling the application of air pressure to the piston and cylinder assembly 134 is opened causing the piston 139 to extend, raising the slide 122. At the same time, the valve connecting the vacuum source to the cylinder 112 of the extract head 36 is closed, so that the old component is dropped. The raising of the slide 122 now carries both heads 34, 36 upwardly. Simultaneously, the piston 52 of the soldering unit 38 descends, removing the wave crest so that the solder solidifies around the new component. This last step is shown in Step 6 of FIG. 6.

Figure 9:
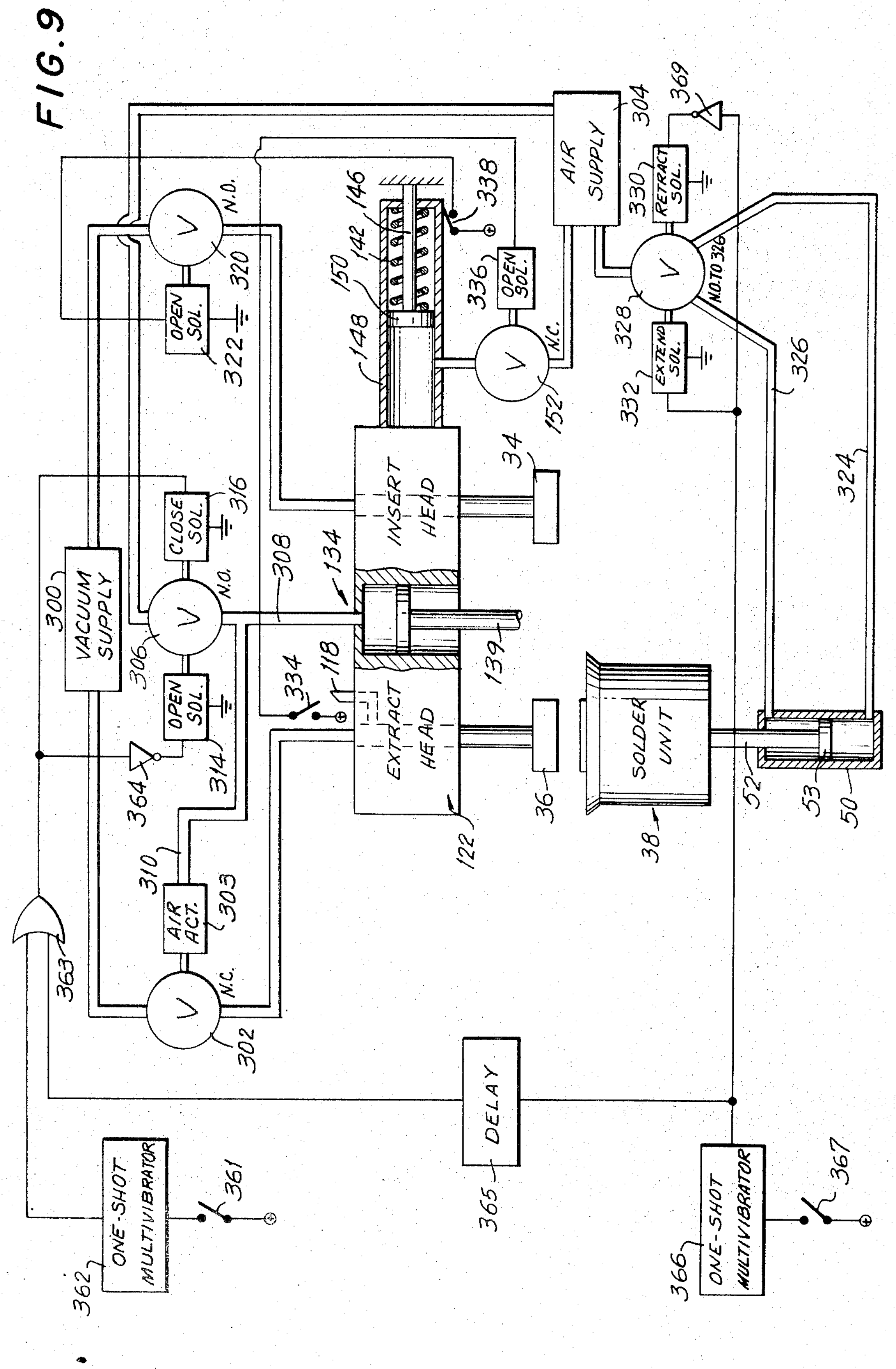
FIG. 9 is a schematic of the hydraulic circuit for the apparatus.

FIG. 9 shows schematically, a combined electrical and hydraulic circuit for the apparatus for removing and replacing multi-pinned components mounted on circuit boards. Certain of the valves in the diagram are designated as either normally open (N.O.) or normally closed (N.C.), these positions of the various valves being taken when the slide 122 is in its "up" position, the power being "on" and the machine ready to operate.

A vacuum supply 300 is connected to normally closed extract vacuum valve 302, which in turn is connected to the extract head 36. The extract vacuum valve 302 is held in its normally closed position by air actuator 303 which is connected via line 310 to a normally open air valve 306, which in turn is fed by an air supply 304. The air valve 306 is held in its normally open position by "open" solenoid 314. The output of OR gate 363 is normally low to de-energize solenoid 316. The output of inverter 364 is normally high to energize solenoid 314. The vacuum supply 300 also leads into the normally open insert vacuum valve 320, which in turn leads into the insert head 34. Valve 320 is normally held open by "open" solenoid 322 which is energized by the normally closed contacts of microswitch 338.

Piston rod 52, which reciprocates in the soldering unit 38, and which is controlled by piston and cylinder assembly 50, is operated by air valve 328, which via two lines 324, 326, controls the position of the rod 52 by acting upon piston 53. The air valve 328 is normally open to line 326 so that the rod 52 is normally retracted. The air valve is kept normally open to line 326 by "retract" solenoid 330. The output of multivibrator 366 is normally low to keep "extend" solenoid 332 de-energized; the output of inverter 369 which is normally high maintains solenoid 330 energized.

The slide 122 is raised and lowered by piston and cylinder assembly 134. Air is normally fed into the assembly from supply 304 through air valve 306 which, as mentioned, is normally open. The air pressure inside assembly 134 keeps slide 122 in its uppermost position relative to piston rod 139.

In the first step of the operation of the apparatus, the slide 122 is lowered, so that the insertion head 34 can pick up a module sitting in the pad 106. This is done by closing switch 361 which triggers one-shot multivibrator 362 whose output goes high. The output of OR gate 363 goes high to de-energize solenoid 314 and to energize solenoid 316. Air valve 306 closes and also allows the air pressure in assembly 134 to bleed to atmosphere. This causes the slide 122 to drop, so that the insert head 34 comes into contact with the new module, whereupon, as previously explained, this head withdraws into the slide and the new module is held against the head by the vacuum extended through normally open valve 320. When multivibrator 362 times out, valve 306 opens once again to cause slide 122 to be raised.

Next, the slide 122 is moved along the X and Y axes with respect to the circuit board B and over the module to be replaced. Switch 367 is then operated to trigger one-shot multivibrator 366 whose output goes high. The "extend" solenoid 332 operates rather than the "retract" solenoid 330 to open valve 328 to line 324 rather than line 326. Piston rod 52 is thus raised into solder unit 38, causing the appearance of a solder wave crest. Shortly thereafter, by a time determined by the delay of element 365, the pulse at the output of multivibrator 366 is extended to the second input of OR gate 363. This causes slide 122 to once again be lowered and the vacuum source 300 to be coupled to the extract head.

Figure 4:
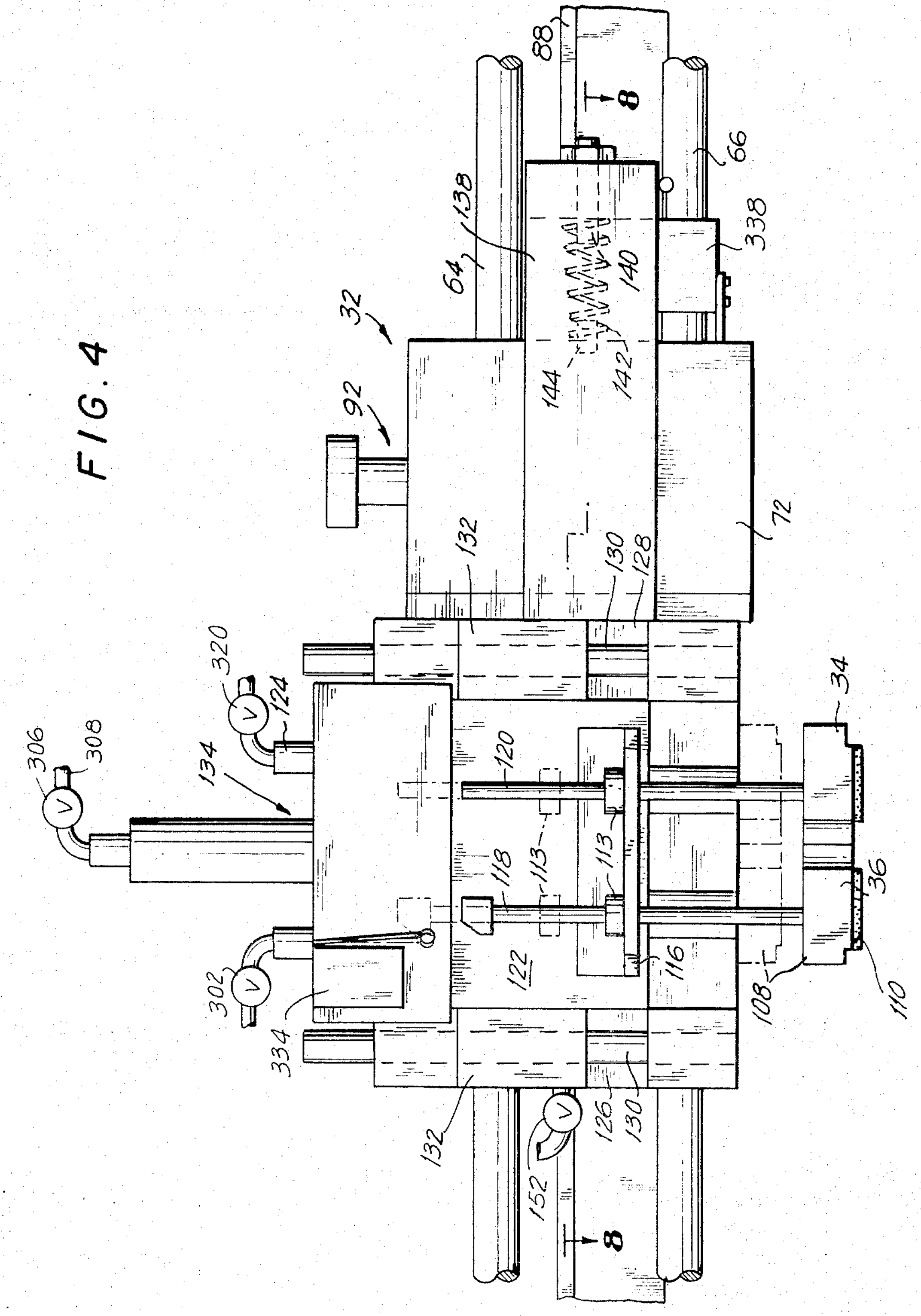
FIG. 4 is an enlarged front elevational view of the head assembly of the apparatus, taken substantially along the line 4—4 of FIG. 2.

As the slide 122 drops, the head 36 comes into contact with the old module, engages it, and pulls it upwardly from the circuit board, with the head 36 shifting upwardly with respect to the slide 122. As seen in FIG. 4, this upward movement causes rod 118 to close normally open microswitch 334, which causes "open" solenoid 336 to energize. Air valve 152 opens to allow air from supply 304 to enter the cylinder 148. Since piston rod 146 if fixed, the cylinder 148 (together with slide 122) shifts to the left. This, in turn, allows the previously closed microswitch 338 (see FIG. 4) to open. Solenoid 322 de-energizes to close valve 320, thereby shutting off the vacuum to head 34. This causes the head 34 (now over the empty module site on the board) to drop, inserting the new module into the circuit board.

When the output of multivibrator 366 goes low, valve 328 is once again opened to line 326 and piston rod 52 is retracted. Shortly thereafter, at a time determined by the delay of element 365, valve 306 opens once again. Slide 122 is raised. Also, valve 302 is closed by air actuator 303 and the old module is released. Head 36 drops and opens switch 334. Solenoid 336 de-energizes once again and valve 152 closes and allows air to bleed from cylinder 148. The slide 122 is returned to the right under the force of spring 142. Switch 338 is closed so that valve 322 opens once again. At this time, all elements are in the required conditions for the start of a new operation.

A latitude of modification, change and substitution is intended in the foregoing disclosure and in some instances some features of the invention will be employed without a corresponding use of other features. Accordingly, it is appropriate that the appended claims be construed broadly and in a manner consistent with the spirit and scope of the invention herein.

What we claim is:

1. Apparatus for removing and replacing selected components soldered into circuit boards comprising means for positioning at least one replacement component with respect to at least one selected component mounted on the circuit board, means for removing said selected component from the circuit board and implanting said replacement component in its place, the removing and implanting means includes an assembly having at least one head for operating upon a component and means mounting said head for movement toward and away from the circuit board, a soldering unit cooperating with said assembly, the positioning means comprises first means mounting the assembly for movement along a first axis, means indexing said assembly along said first axis, second means mounting said assembly for movement along a second axis transverse to the first axis, means indexing said assembly along said second axis, a frame and wherein the first means comprises a first elongated rod mounted on the frame parallel to the first axis, a member mounted to slide along the first rod, and a second elongated rod carried by said member parallel to the second axis, and means mounting the head assembly to slide along the second rod.

2. Apparatus for removing and replacing selected components soldered into circuit boards comprising means for positioning at least one replacement component with respect to at least one selected component mounted on the circuit board, means for removing said selected component from the circuit board and implanting said replacement component in its place, the removing and implanting means including an assembly having at least one head for operating upon a component and means mounting said head for movement toward and away from the circuit board, a soldering unit cooperating with said assembly, the positioning means comprises first means mounting the assembly for movement along a first axis, means indexing said assembly along said first axis, second means mounting said assembly for movement along a second axis transverse to the first axis, means indexing said assembly along said second axis, each indexing means comprises a rod parallel to a different axis, each rod having formed therein a set of uniformly spaced apertures, and a detent selectively engagable with any aperture in its associated rod.

3. Apparatus for removing and replacing selected pronged components soldered into circuit boards comprising means for positioning at least one replacement component with respect to at least one selected component mounted on the circuit board, means for removing said selected component from the circuit board and implanting said replacement component in its place, the removing and implanting means includes an assembly having at least one head for operating upon a component and means mounting said head for movement toward and away from the circuit board, a soldering unit cooperating with said assembly, a frame and means mounting the circuit board in a horizontal plane on the frame and wherein the assembly is positioned over the circuit board and the soldering unit is positioned below the circuit board.

4. Apparatus for removing and replacing selected pronged components soldered into circuit boards comprising means for positioning at least one replacement component with respect to at least one selected component mounted on the circuit board, means for removing said selected component from the circuit board and implanting said replacement component in its place, the removing and implanting means includes an assembly having at least one head for operating upon a component and means mounting said head for movement toward and away from the circuit board, a soldering unit cooperating with said assembly, the assembly comprises a pair of heads for operating on at least two components and means mounting said heads for independent movement toward and away from the circuit board.

5. Apparatus for removing and replacing selected pronged components soldered into circuit boards as set forth in claim 4 further including a vacuum source leading into each head and means enabling sealing of each head with a component to form a vacuum.

6. Apparatus for removing and replacing selected pronged components soldered into circuit boards as set forth in claim 5 wherein the means enabling sealing comprises an open cylinder in each head into which the vacuum source leads and a washer at the end of each cylinder for mating with a component.

7. Apparatus for removing and replacing selected pronged components soldered into circuit boards as set forth in claim 5 wherein the mounting means for each head comprises a bore in the assembly, an open cylinder slidable in said bore into which the vacuum source leads and wherein the means enabling sealing comprises a head carried by the end of the cylinder and a washer carried by the head for mating with a component, whereby sealing of a component with the washer seals the cylinder to cause a pressure drop therein, whereby the cylinder retracts into the assembly.

8. Apparatus for removing and replacing selected pronged components soldered into circuit boards as set forth in claim 7 wherein a spring is located in at least one cylinder to urge said cylinder outwardly from the bore.

9. Apparatus for removing and replacing selected pronged components soldered into circuit boards as set forth in claim 4 wherein stepping means shifts the heads so that one head is transported to the location of the other head.

10. Apparatus for removing and replacing selected pronged components soldered into circuit boards as set forth in claim 9 wherein the assembly further includes a slide, means mounting the slide for movement toward and away from the circuit board, the heads being mounted for movement on the slide.

11. Apparatus for removing and replacing selected pronged components soldered into circuit boards as set forth in claim 4 further including a vacuum source leading into each head, means enabling sealing of each head with a component to form a vacuum therein to thereupon retract the head away from the board, a slide, means mounting the slide for limited movement toward and away from the board between extended and retracted positions, the heads being mounted for limited movement on the slide between extended and retracted positions, a head in its extended position, with the slide in its extended position, contacting a component mounted in the board.

* * * * *